(No Model.)
P. LANGE.
ELECTRIC METER.
No. 392,439. Patented Nov. 6, 1888.
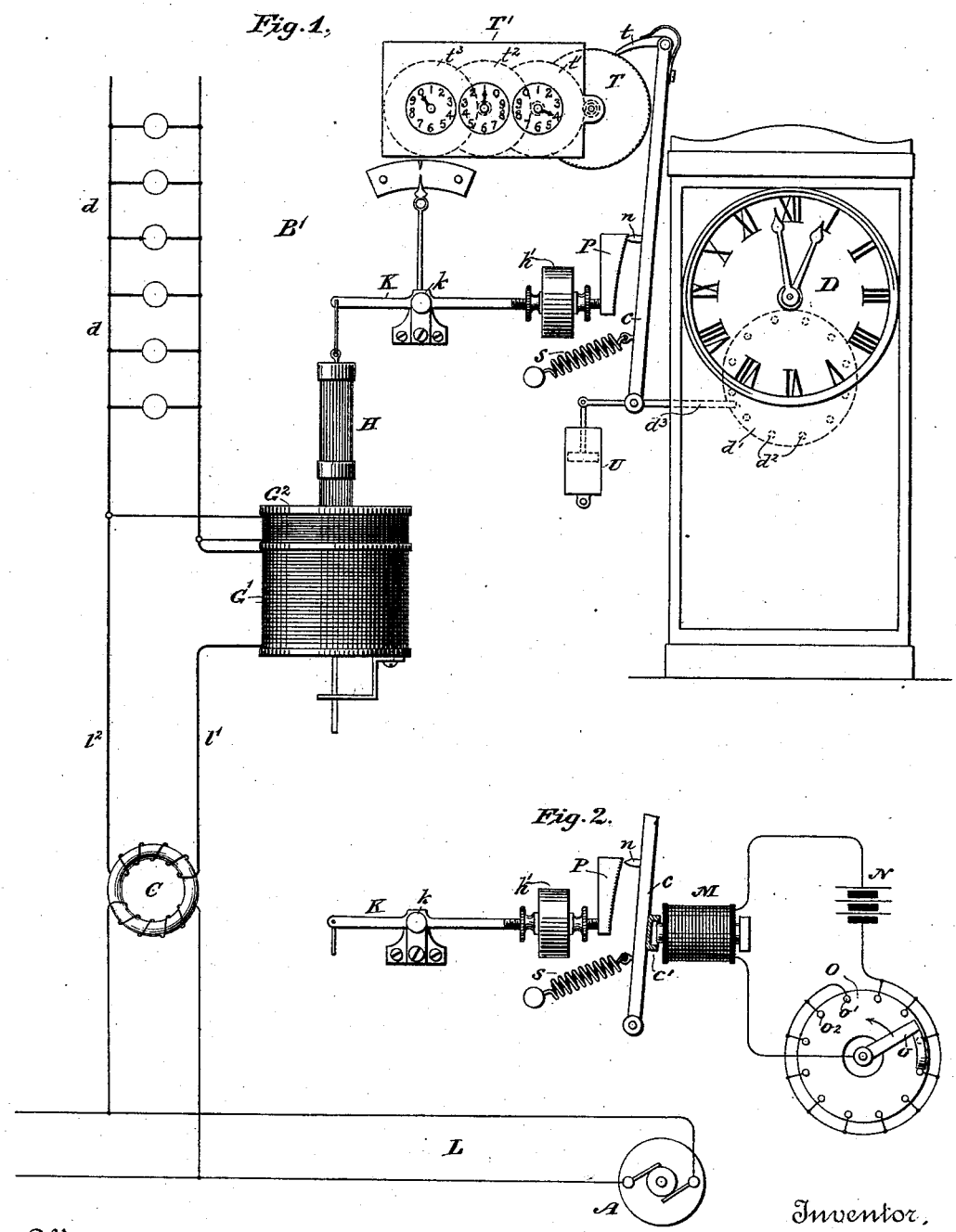
Witnesses.
Geo. W. Breck.
Eugene J. Reilly.
Inventor,
Philip Lange,
By his Attorneys
Pope Edgecomb & Ferry.

UNITED STATES PATENT OFFICE.

PHILIP LANGE, OF PITTSBURG, PENNSYLVANIA, ASSIGNOR TO THE WESTINGHOUSE ELECTRIC COMPANY, OF SAME PLACE.

ELECTRIC METER.

SPECIFICATION forming part of Letters Patent No. 392,439, dated November 6, 1888.

Application filed March 20, 1888. Serial No. 267,800. (No model.)

*To all whom it may concern:*

Be it known that I, PHILIP LANGE, a citizen of the United States, residing in Pittsburg, in the county of Allegheny, in the State of Pennsylvania, have invented certain new and useful Improvements in Electric Meters, (Case 205,) of which the following is a specification.

The invention relates to the class of apparatus employed for measuring electric currents and registering the current consumed in operating any given translating devices or system thereof.

The object of the invention is to provide reliable and accurate means for giving a record of the current consumed at or near any given point during any given time.

The invention consists in applying to a suitable apparatus responding to variations in the current consumed a device serving to periodically give a registration or operate a registering mechanism to a degree dependent upon the position of the apparatus, and thus upon the current consumed.

In carrying out the invention there is included in the consumption-circuit a meter device—such, for instance, as an ammeter composed of a coil of wire included in series with the translating devices—into which a core is movable a greater or less distance, according to the current being consumed. To this device there is applied a recording or registering lever adapted to operate suitable registering mechanism. This lever is moved in one direction periodically by any suitable mechanism, or by an electro-magnet through which a circuit is periodically completed, and in the opposite direction by a spring or weight or by other suitable means. The amplitude of the vibrations of the lever are, however, controlled by the position of the core of the meter device. The registering mechanism is moved a greater or less distance, accordingly as the amplitude of the vibrations is increased or diminished.

In the accompanying drawings, Figure 1 is an elevation of such portions of the apparatus as will serve to illustrate the invention, and Fig. 2 illustates a modification.

Referring to the figures, A represents a suitable source of electric currents, and L its circuit. The conductor L leads to the several stations supplied with currents from the source A. At the station B', for instance, there are located translating devices $d\, d$, supplied in this instance through a converter, C, from the circuit L, the generator A being adapted in this instance to transmit alternating electric currents.

Conductors $l'\, l^2$ lead to the translating devices $d\, d$, which are connected in multiple arc. In the conductor $l'$ there is included a coil, $G'$, of such size and conductivity as to convey the entire current required for the translating devices. An assisting-coil, $G^2$, is employed in connection with the coil $G'$. The latter is connected in multiple arc with the translating devices. These coils are provided with a core, H, which is preferably composed of soft-iron wires electrically insulated from each other. The core is suspended from a lever, K, which is carried upon a knife edge or pivot, $k$. A counterpoise, $k'$, is adjustable upon the lever and serves to balance both the weight of the core and the pull exerted by the current traversing the shunt-coil $G^2$.

The lever K carries a curved plate, P. The lever $c$ carries a point or knife-edge, $n$, opposite the curved face of the plate. The face of the plate is indented, roughened, or corrugated, so that the point will not slip along its surface when the two are in contact. A spring or weight, $s$, tends to hold the lever toward the plate, with the point $n$ in contact therewith. A clock mechanism, D, of any suitable character, may be employed for periodically withdrawing the lever from the plate P, thus allowing the core to set itself in the coils at a position dependent upon the current being consumed. For this purpose a wheel, $d'$, driven by the clock-train, carries pins $d^2$ at the proper intervals, and these periodically engage a tailpiece, $d^3$, upon the lever $c$ and draw it back and subsequently release it, allowing it to be drawn forward by the spring.

It is evident that the distance which it will be drawn forward will be dependent upon the position of the core and of the plate P.

A dash-pot, U, may be employed for rendering the movements of the lever slow.

Upon the lever $c$ there is carried a pawl, $t$, which engages the teeth of a wheel, T. This wheel will therefore be turned a distance dependent upon the forward movement of the lever, and thus upon the position of the core H. A corresponding registration will be made upon the train T', which is any suitable indicating mechanism for showing the current being consumed and registering the same. As here shown, it consists of three dials having indicators driven through gear wheels or pinions, as shown at t' t² t³.

It is obvious that by varying the form of the curve of the plate P the rate of movement of the wheel T may be varied and the apparatus adapted to the requirements of any particular case. The registration which is performed by the dials may be made to show the ampère-hours, the lamp-hours, or money value directly by varying the ratio of the current-unit to the teeth upon the wheel T or to the gear-wheels. When the meter is out of circuit and no current is being consumed, the point n will rest against the upper portion of the plate P, and this will prevent any movement of the lever c sufficient to carry forward the recording-wheel T.

Instead of throwing back the lever c mechanically, an electro-magnet, M, may be employed, as shown in Fig. 2. This is here shown as being connected through a suitable circuit-closing device, O. The device O may consist of a series of contact-points, o' o², &c., and a contact-brush, o, which is revolved over the pins and makes contact therewith successively. The brush is insulated from the points, and is connected through the magnet with one pole of a battery, N, the other pole of which is connected with the pins. It may be found advantageous when an electro-magnet is employed to use an annular armature, c', upon the lever. The pole of the electro-magnet may be extended into the armature as the latter is drawn toward it. The operation is essentially the same as that already described.

I claim as my invention—

1. In an electric meter, the combination of a solenoid, a core or armature acted upon thereby, a limiting-stop set in position by means of the core, a recording-wheel, a lever for actuating the same, means for periodically moving the lever a distance dependent upon the position of said limiting-stop, and thereby actuating the recording-wheel, and an independent clock mechanism for causing a periodical movement of the lever in the opposite direction.

2. In an electric meter, the combination of a solenoid, a core or armature applied thereto, a lever to which the latter is attached, a train of gear-wheels, a second lever to which the first lever acts as a limiting-stop, a pawl upon the second lever for actuating the gear-wheels, a spring tending to move the second lever in one direction, and an independent clock-train for causing a periodical movement of the lever in the opposite direction.

3. The combination of a solenoid, a core or armature of soft iron actuated thereby, an adjustable limiting device controlled by means of the solenoid or core, a recording-lever, a spring or weight for moving the lever in one direction, a stop carried by the lever engaged by the adjustable limiting device, a local clock-train, and an electro-magnet or equivalent device brought into operation periodically by the clock-train to move the lever in the opposite direction.

4. The combination of a solenoid, a core or armature of soft iron actuated thereby, an adjustable limiting device controlled by means of the solenoid or core, a recording-lever, a clock-train, an electro-magnet caused to be periodically vitalized by the clock-train for moving the lever in one direction, an opposing spring or weight for moving the lever in the opposite direction, a stop carried by the lever engaged by the adjustable limiting device, and an armature for the electro-magnet annular in form into which the pole of the magnet enters.

In testimony whereof I have hereunto subscribed my name this 17th day of January, A. D. 1888.

PHILIP LANGE.

Witnesses:
JNO. E. BONHAM,
W. D. UPTEGRAFF.